May 28, 1957 W. W. CLARKE 2,793,817
APPARATUS FOR WINDING COILS
Filed Dec. 11, 1953 5 Sheets-Sheet 1
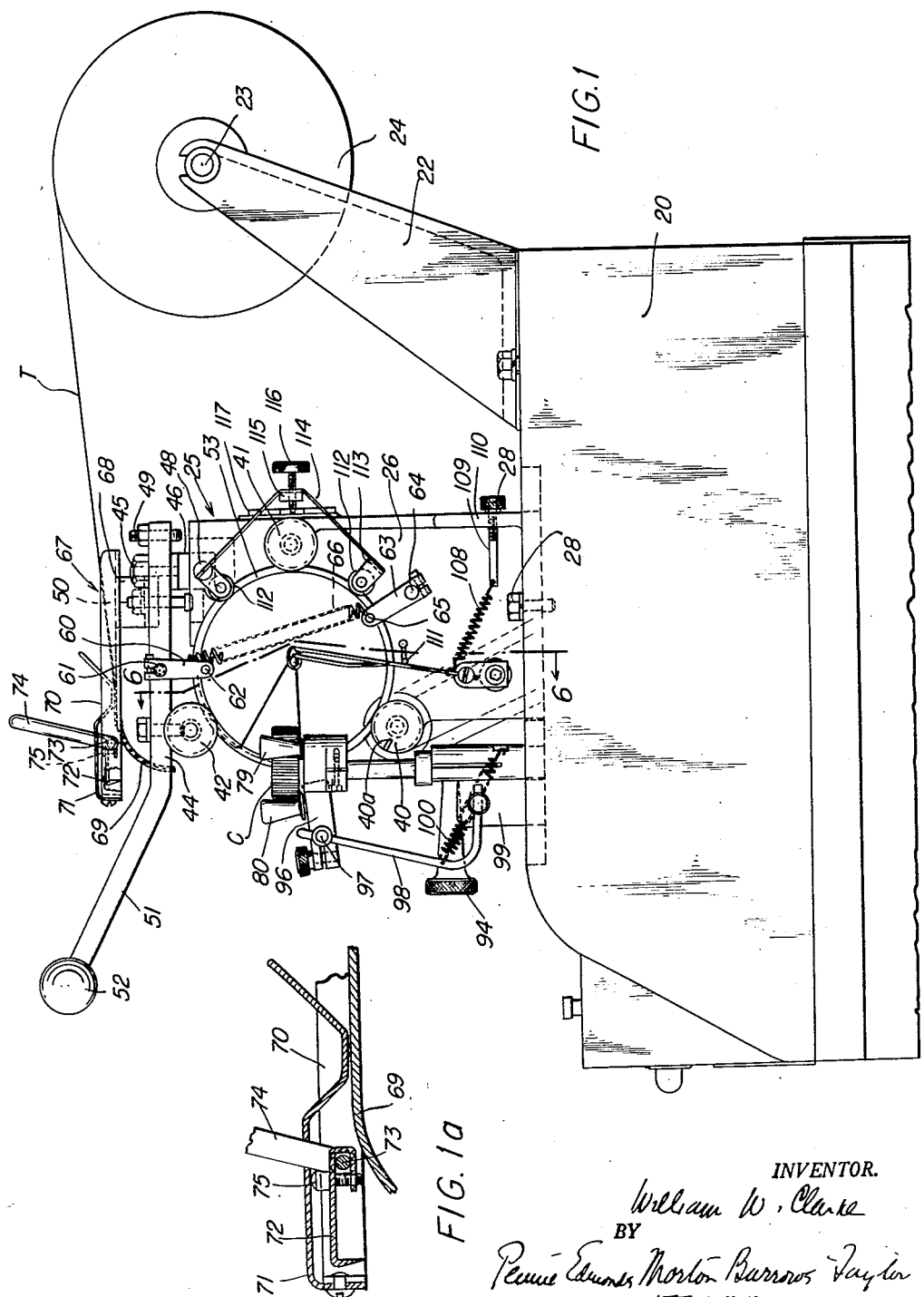
INVENTOR.
William W. Clarke
BY
Pennie Edmonds Morton Barrows Taylor
ATTORNEYS

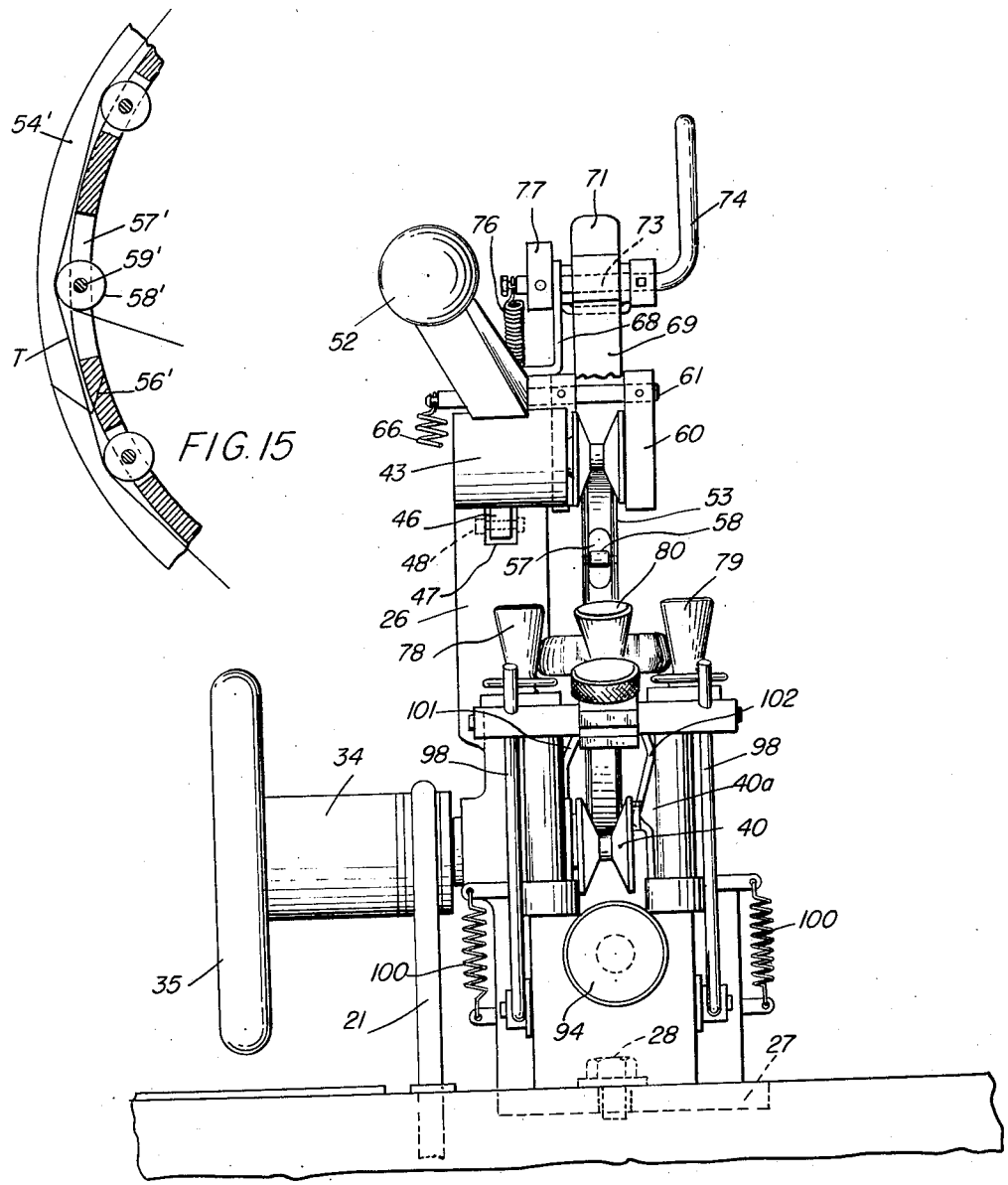

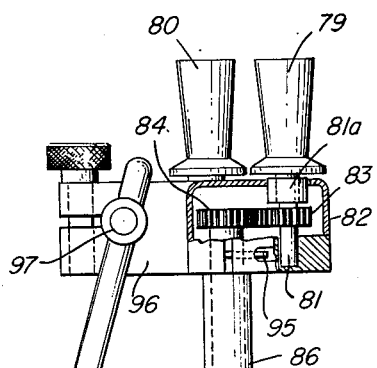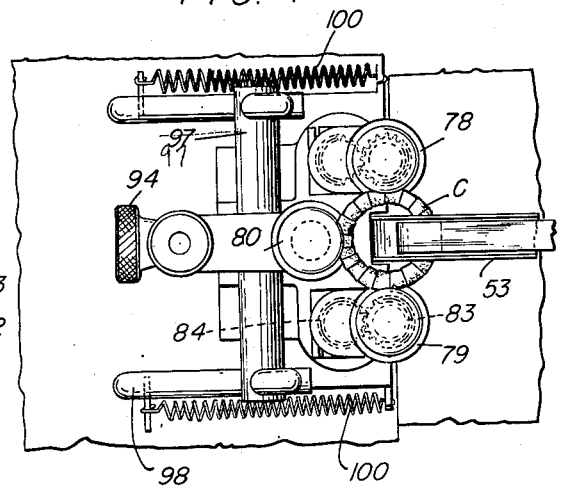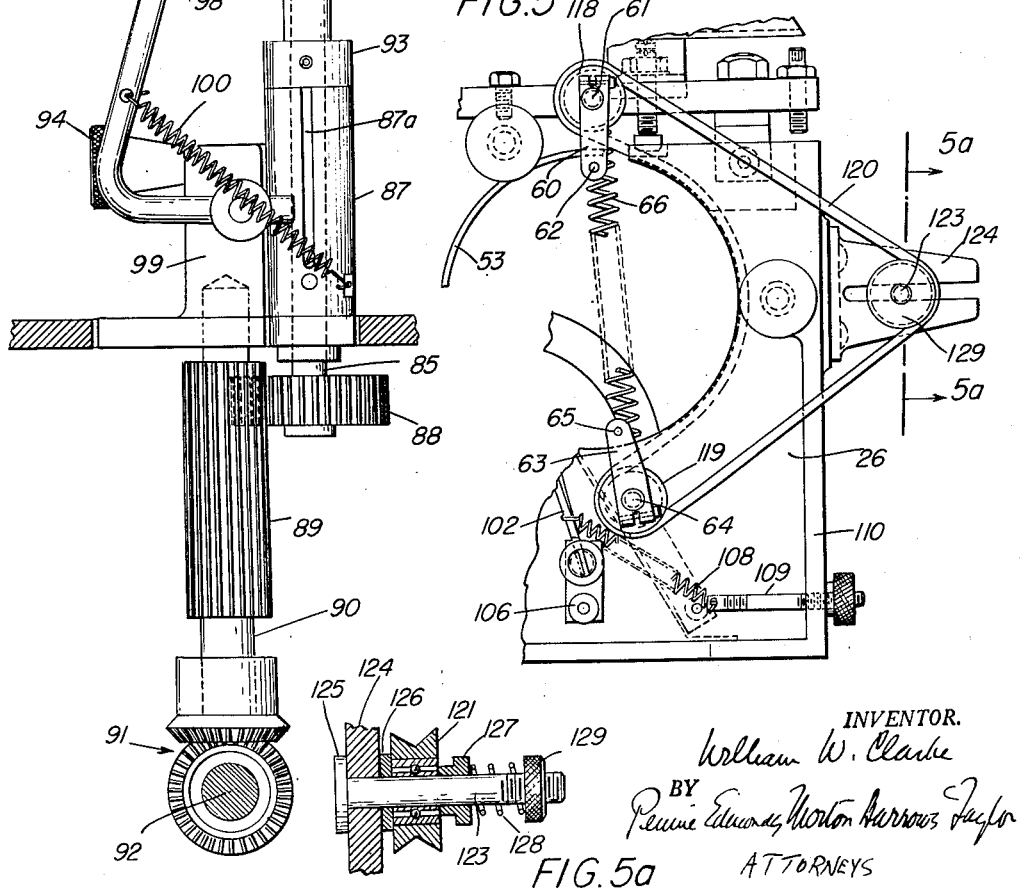

May 28, 1957 W. W. CLARKE 2,793,817
APPARATUS FOR WINDING COILS
Filed Dec. 11, 1953 5 Sheets-Sheet 4
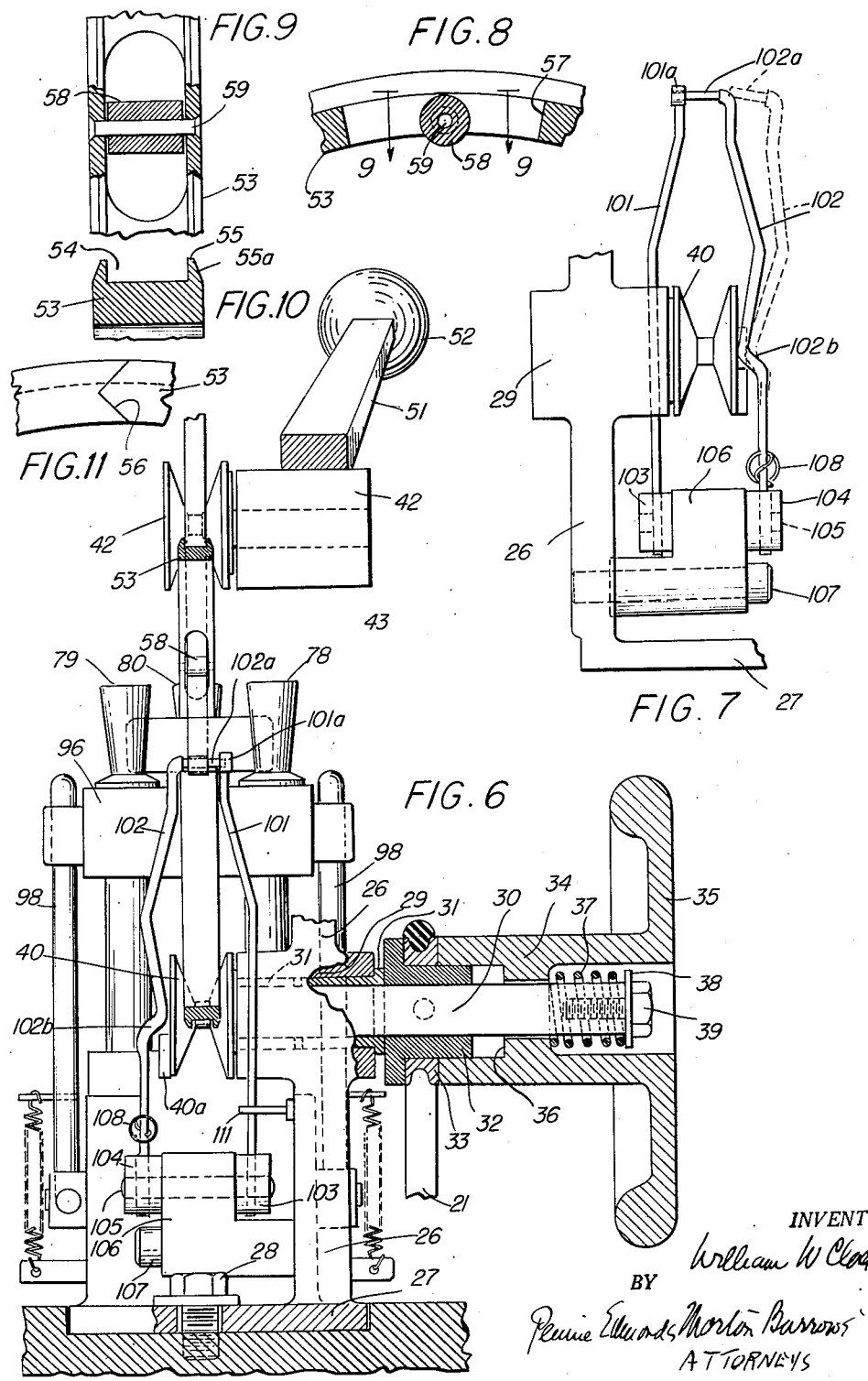

May 28, 1957 W. W. CLARKE 2,793,817
APPARATUS FOR WINDING COILS
Filed Dec. 11, 1953 5 Sheets-Sheet 5

INVENTOR.
William W. Clarke
BY
Pennie Edmonds Morton Barrows Taylor
ATTORNEYS

United States Patent Office 2,793,817
Patented May 28, 1957

2,793,817
APPARATUS FOR WINDING COILS

William W. Clarke, Brookfield, Conn., assignor to Boesch Manufacturing Co., Inc., Danbury, Conn., a corporation of Connecticut Application December 11, 1953, Serial No. 397,693

5 Claims. (Cl. 242—4)

This invention relates to machines for wrapping a tape helically upon an object of generally annular form and is concerned more particularly with a novel wrapping machine of the winding and shuttle ring type, which is provided with means for maintaining the tape under substantially uniform tension throughout the wrapping operation. The new machine may be employed in wrapping objects of various kinds and, since all of the advantages of the invention are realized in a machine for applying insulating tape to the loading coils employed in telephone circuits, a form of the machine suitable for that purpose will be illustrated and described in detail for purposes of explanation. Certain features of the invention may be employed in machines for winding a strand, such as wire, upon a core in the production of loading coils and a winding machine containing such features will also be illustrated and described.

A wrapping machine constructed in accordance with the invention includes a winding and shuttle ring, which has a joint, so that it may be opened and interlinked with the object, and is formed with a peripheral channel to receive a supply of the tape wound spirally. The ring is formed with a radial opening through the bottom of the channel for the passage of the tape and, preferably, a roller is mounted in the opening to provide a rotating guide for the tape. A pair of cooperating members engage the tape between the ring and the object and temporarily restrain the tape and hold it taut at the place where slack would otherwise develop. In addition, means engage the winding of tape on the ring and restrain its movement relative to the ring, so as to insure that the tape will be held under tension.

For a better understanding of the invention, reference may be made to the accompanying drawings, in which Fig. 1 is a view in side elevation of a tape wrapping machine constructed in accordance with the invention;

Fig. 1a is a sectional view on an enlarged scale of parts of the machine shown in Fig. 1;

Fig. 2 is a view in front elevation of the machine of Fig. 1;

Fig. 3 is a fragmentary view, partly in elevation and partly in vertical section, of the means for holding and rotating the object during wrapping;

Fig. 4 is a plan view of the parts of the machine shown in Fig. 3;

Fig. 5 is a fragmentary view in side elevation showing a modified form of tension means;

Fig. 5a is a longitudinal sectional view on the line 5a—5a of Fig. 5;

Fig. 6 is a sectional view on the line 6—6 of Fig. 1;

Fig. 7 is a fragmentary elevational view showing the operation of one tensioning means;

Fig. 8 is a fragmentary sectional view through a part of the winding and shuttle ring;

Fig. 9 is a sectional view on the line 9—9 of Fig. 8;

Fig. 10 is a radial sectional view through the ring;

Fig. 11 is a fragmentary side elevational view of the ring, showing the joint;

Fig. 15 is a fragmentary side elevational view with parts broken away showing a modified form of the winding and shuttle ring.

Figure 12:
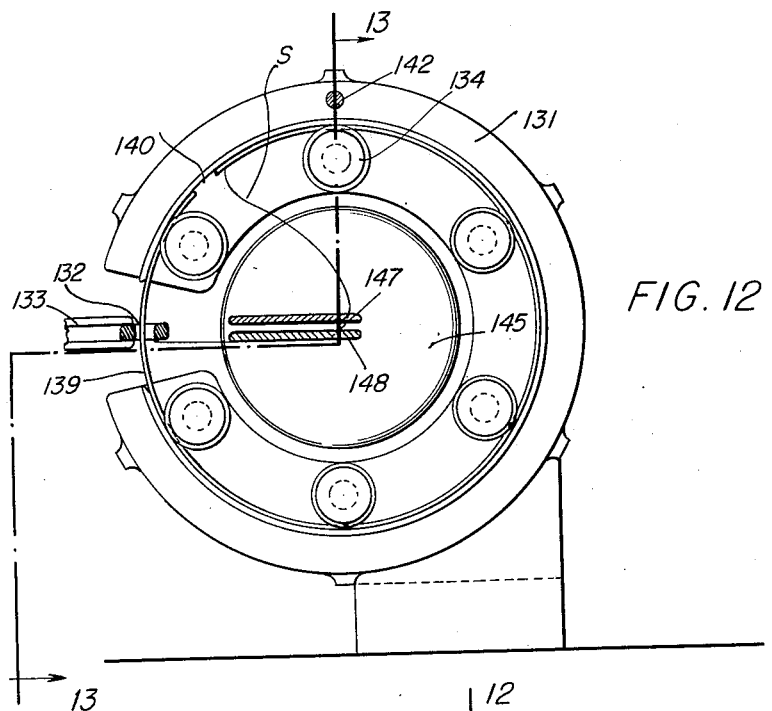
Fig. 12 is a sectional view on the line 12—12 of Fig. 13 showing a modified form of the machine for winding a strand upon a core.

The machine for winding tape illustrated in Fig. 1 comprises a housing 20 mounted on a suitable support at a convenient height above the floor and containing the driving motor, a speed reduction device, etc., (not shown). A belt 21 trained about a pulley driven by the output shaft of the device passes upward through an opening in the top of the base and drives the winding and shuttle ring. At its rear, the housing carries a bracket 22 supporting a shaft 23, on which is mounted a spool 24 of tape T. Forward of the bracket, a winding head, generally designated 25, is mounted on top of the housing.

The winding head comprises a plate 26 having a foot 27, which lies within a slot in the top of the housing. The plate is movable lengthwise of the slot and the foot is held in the desired position by a bolt 28, which passes through a slot in the foot and into the top of the housing. The plate 26 is formed with a boss 29 having an opening, through which extends a shaft 30 rotatable in bearing bushings 31 mounted in opposite ends of the opening through the boss. At one side of the plate, a sleeve 32 with a circumferential flange at one end encloses and is secured to the shaft for rotation therewith by any suitable means. A peripherally grooved ring 33, which serves as a pulley for belt 21, is mounted on the sleeve for free rotation and can be forced against the flange on the sleeve by the tubular hub 34 of a hand wheel 35. The hub encircles the shaft and its free end encloses sleeve 32 and bears against the outer face of pulley 33. The hub 34 is provided with an internal flange 36 engaged by one end of a spring 37 having its other end bearing against a washer 38 held in place by a screw 39 threaded into the end of shaft 30. With the arrangement described, the spring 37 causes hub 34 to clamp pulley 33 against the flange on sleeve 32 and, as a result, the rotation of the pulley by the belt causes rotation of the shaft. If it is desired to stop the shaft, hand wheel 35 can be gripped and either held against rotation or pulled outwardly to a slight extent against the action of spring 37. This permits pulley 33 to rotate freely on sleeve 32 without causing rotation of shaft 30.

The end of shaft 30 projecting from the other side of boss 29 carries a grooved pulley 40 fast thereon, the pulley having the form of a pair of coned discs. A similar pulley 41 is fast on a shaft supported for free rotation in a bearing carried by plate 26, and a pulley 42, which is also similar to pulley 40, is mounted fast on a shaft supported for free rotation in a bearing 43 carried by a lever 44. The lever is mounted for horizontal swinging movement on a bolt 45 threaded into a block 46, which lies within a slot 47 in the top of plate 26 and is mounted for vertical swinging movement in the slot on a pin 48. The lever 44 is provided with an adjustment screw 49, which is adapted to engage the top of plate 26 and limit the swinging movement of the lever and block 46 about pin 48 as a pivot. The lever also carries a bolt 50, which extends into slot 47 and prevents the lever from being swung sidewise until after it has been swung in a vertical plane to a sufficient extent to raise the lower end of bolt 50 out of the slot. The lever 44 is provided with a handle 51 carrying a knob 52, by which the lever can be manipulated, as described.

The pulleys 40, 41 and 42 are spaced approximately 120° apart and a winding and shuttle ring 53 lies within the pulleys and is mounted in the grooves of the pulleys for rotation. The ring is formed with a peripheral channel 54 defined by parallel flanges 55 lying at right angles to the axis of the ring and the outer walls of the flanges are cut away as indicated at 55a, so that they make good contact with the coned faces of the pulleys. The ring is formed with an irregular transverse joint 56 and can be opened at the joint to enable it to be interlinked with the object to be wrapped. The ring has an opening 57 extending through it radially from the bottom of the channel and the opening is preferably not farther than 90° along the ring from the joint. Preferably, a roller 58 is mounted within the opening for free rotation on a pin 59 mounted in the ring at opposite sides of the opening. The roller is so disposed, that its outer surface lies tangent to the projection of the bottom of channel 54 across the opening.

In order to open the ring, as, for example, when it is to be interlinked with a coil C to be wrapped or a wrapped coil is to be removed from the machine, the lever 44 is provided with a pair of arms 60 mounted adjustably and in spaced relation on a pin 61 rigidly carried by the lever and projecting laterally therefrom. The arms 60 are spaced a distance sufficient to permit the ring to be inserted between them and they are connected at their lower ends by a pin 62. A similar pair of arms 63 are mounted adjustably on a pin 64 carried by plate 26 below the ring 53 and arms 63 extend upwardly from pin 64 in position to receive the ring between them and their upper ends are connected by a pin 65. The pins 62 and 65 are connected by a spring 66, which resists the upward movement of the lever 44 and arms 60.

The tape T is led from a supply spool 24 to a support, generally designated 67, which is carried by a bracket 68 attached to lever 44. The support comprises a bottom plate 69 and sides 70 rising therefrom, the plate 69 being bent down at its forward ends below sides 70. A leaf spring 71 mounted at the forward end of the support extends rearwardly with its free end entering between the sides and having a surface opposed to the bottom plate 69. An arm 72 having its front end sharpened to form a knife edge is mounted between sides 70 on a pin 73 and may be swung by a handle 74 to cause the knife edge to contact with the curved portion of plate 69. Arm 72 carries a cam stud 75 operable, when the knife edge is spaced from plate 69, to hold spring 71 spaced from the plate. When the arm is swung to cause the knife edge to engage the plate, the cam stud is moved away from the spring and the latter engages the plate. Arm 72 is normally held with the knife edge in inoperative position by means of a spring 76 attached to an arm 77 fast on pin 73.

The coil C or other annular object to be wrapped is supported during the wrapping operation in contact with three rollers, of which rollers 78, 79 are driven, while roller 80 is an idler. Each of rollers 78 and 79 is mounted on a shaft 81 supported for rotation in a bushing 81a in the wall of a housing 82 and the shaft carries a pinion 83 meshing with a pinion 84 on a shaft 85 extending through a tube 86, on which the housing is clamped. Each of the tubes 86 projects into an opening in a block 87, which is seated within the slot 27 at the top of the housing 20. At its lower end, each shaft 85 is provided with a pinion 88 meshing with a long gear 89 on a shaft 90 driven through bevelled gearing 91 by a shaft 92, which is driven by the speed reduction device through means not shown. The passages in block 87, into which tubes 86 extend, are slotted as indicated at 87a, and the two parts of the block on opposite sides of each slot can be moved toward and away from each other by a screw 94 with a knurled head. Tubes 86 may, accordingly, be adjusted up and down in their passages in block 87, as may be necessary in the winding of coils of different size. Similarly, the openings in housings 82 receiving the ends of tubes 86 are slotted and the walls of the slots can be drawn together by screws 95. The housings can, accordingly, be swung about the axes of shafts 85 and clamped in different positions, as may be necessary for coils of different diameter.

The third roller 80 is an idler roller mounted for rotation on a shaft in a bearing in a block 96 clamped to a pin 97 extending between a pair of arms 98 pivotally mounted on a block 99 seated in the slot 27 in the top of the housing 20. The arms are acted on by springs 100 connected to the arms and to fixed portions of the machine and the attachment of the springs to the arms is such that the springs act to urge the arms clockwise or counter-clockwise, according to the position of the arms.

In the winding of a coil on the machine, the winding and shuttle ring 53 supported in pulleys 40, 41, and 42 and lying outside pins 62 and 65 is first turned by hand wheel 35 to bring its joint close to the rollers 78, 79. The arms 98 carrying rollers 80 are then swung outwardly to a position, in which the springs 100 urge the arms downwardly. The lever 44 is then swung upwardly and to one side and, in such movement, the pin 62 engaging the ring at one side of the joint separates the ends of the ring and causes its upper end to move laterally, while the lower part of the ring is held in place by pin 65. The coil is then threaded over the lower end of the ring and against rollers 78, 79 and the lever 44 is swung back to its original position, so that the joint in the ring is closed. The arms 98 are next swung upwardly, so that roller 80 holds the coil against rollers 78, 79. The machine is now ready for the first operation, which is that of winding a supply of the tape upon the ring. For this purpose, the tape is drawn from spool 24 over the bottom plate 69 of support 67 and the end of the tape is led down the curved surface of plate 69 and inserted through the opening in the ring. While the end of the tape, which is passed through the opening, is held at the interior of the ring, the machine is started and the ring rotated by rotation of pulley 40. During the rotation of the ring, tape is drawn from the spool 24 and wound upon the ring and the rotation of the ring is continued, until a length of tape sufficient for wrapping one of the coils has been wound on the ring. In the winding operation to load the ring with tape, the end of the tape need be held only until a little more than a complete convolution of the tape winding has been applied to the ring. When the loading of the ring has been completed, the machine is stopped and the handle 74 pulled forward to cause the knife 72 to sever the tape against plate 69. The machine is now ready to wrap the coil.

In the wrapping of a coil, the winding and shuttle ring 53 is rotated through the center of the coil and the tape drawn from the inmost convolution of the winding on the ring is wrapped about the coil. Accordingly, the wrapping is started with the inner end of the tape held against the coil. As the ring rotates, a convolution of the tape wrapping is applied to the coil during each rotation of the ring and the tape for the purpose is drawn through the radial opening 57 in the ring. As the ring is rotated, the rollers 78, 79 are also rotated to rotate the coil and cause the wrapping to be applied helically. During the application of the tape, the winding of tape on the ring rotates relative to the ring, as the tape is fed out.

With tapes, which are relatively extensible, such as that sold commercially under the trademark "Mylar," it is possible to load the winding and shuttle ring by winding tape thereon and, at the same time, wrap a coil with tape drawn through the radial opening in the ring. The reason for this is that the pull on the inner convolution of the winding stretches and thins the tape in this convolution, so that the winding on the ring can slide relative to the ring, as is necessary in the wrapping of the tape on the coil. If the tape is of the relatively non-extensible type, such as a cellophane tape, it is necessary to load the winding ring in a preliminary operation, after which the ring is stopped and the lever 44 manipulated to stretch the tape by applying force to the ring tending to separate its ends. In this stretching of the tape winding, its inner convolution becomes loosened from the ring sufficiently to permit the tape to be pulled from the interior of the winding.

In the application of the tape to a coil, the tape is drawn from the ring and travels over the roller 58 in the opening in the shuttle. As the roller passes through the coil and then travels through 180°, the tape is continually drawn from the winding on the ring, until the length drawn out is a little shorter than the diameter of the ring. Until the roller has been carried through 180°, the tape drawn from the ring is held taut between the roller and the coil, but, when the roller passes beyond 180° from the coil, the distance between the coil and roller becomes progressively shorter than a diameter of the ring and, if nothing were done to prevent it, uncontrolled slack would develop in the portion of the tape between the coil and the roller. Such slack would be taken up by the continued advance of the ring and the passage of the roller thereon a second time through the coil, but, in the absence of any means for controlling the slack tape, there would be portions of the wrapping on the coil, in which the tape would be relatively loose. In the present machine, the development of uncontrolled slack in the tape is prevented and relatively uniform tension on the tape is maintained throughout its application to the coil by means especially provided for the purpose.

The slack in the tape between the coil and the opening 57 through the winding ring is controlled by a pair of cooperating members 101, 102, which may be advantageously formed of wire. The members are mounted in respective collars 103, 104 rotatably mounted on a pin 105 extending through an opening in one arm of a bracket 106. The bracket is mounted on a pin 107 threaded into the plate 26 and is angularly adjustable about the axis of the pin. The members 101 and 102 extend upwardly on opposite sides of the winding ring 53 and member 101 is provided at its upper end with a loop 101a lying parallel to the plane of the ring, while the member 102 terminates in a laterally extending end section 102a, which extends through the winding ring and normally enters loop 101a. The members are urged to swing away from a coil mounted for wrapping by a spring 108, which is connected to member 102 and to an adjustment screw 109 threaded through a standard 110 rising from the foot 27 of plate 26. The movement of the members by the spring is limited by a stop pin 111 mounted on plate 26 and, when the members are against the stop, end section 102a of member 102 lies at approximately the center of ring 53.

When the members 101, 102 are in normal position with the end section 102a entering the loop 101a, the end section extends through the plane of rotation of the ring and, as the opening 57 in the ring passes between the members, the tape issuing through the opening also passes between the members. As the rotation of the ring continues and the opening begins to move upwardly above the horizontal, the length of tape between the opening and the coil engages the end section 102 and begins to bend about end section 102a as a pivot, so that the tape is maintained taut between the coil and end section 102a and between the end section and the opening in the ring. As the opening through the ring begins to move a second time through the coil, the loop of tape between the coil and the opening in the ring about end section 102a is shortened and, as tape is drawn from the loop, the members 101 and 102 are swung toward the coil against the action of spring 108.

The movement of the members toward the coil continues until the members lie on opposite sides of pulley 40 with their free ends close to the coil. The pulley is provided on the face adjacent member 102 with a radial cam 40a and the member 102 is formed with a bend 102b, which lies in the path of the cam as it is rotated with pulley 40. When the loop of tape passing around end section 102a has been reduced almost to zero, the cam 40a on pulley 40 engages the bend 102b on member 102 and flexes the member outwardly, so that end section 102a is released from loop 101a. When this occurs, the loop of tape is released from the end section and the tape is drawn tightly against the coil. At the same time, the members 101 and 102 are drawn back to stop 111 by spring 108 and, in their movement, the member 102 springs back to its normal shape with end section 102a lying within loop 101a. The members are then in position to be engaged again by the tape upon the next passage of the hole in the winding ring from below to above the horizontal.

As a further means of maintaining the tape under tension during its application, the machine is provided with a pair of rollers 112, which bear against the winding of tape in channel 54 in the ring and are mounted for free rotation in respective stirrups 113 attached to the ends of a leaf spring 114. The spring 114 is formed in two sections lying at approximately 90° to each other and connected at the angle to a nut 115 mounted on an adjustment screw 116, which bears against a plate 117 attached to the plate 26 of the winding head. Plate 117 is provided with slots for the two sections of the spring and, by turning screw 116, the nut 115 may be caused to travel, so that the engagement of the sections of the spring with the walls of the slots in plate 117 causes the spring sections to force rollers 112 more or less tightly against the winding of tape on the winding ring. The pressure of the rollers restricts the movement of the tape winding relative to the ring to a degree dependent upon the pressure, and such restriction of the movement of the tape winding relative to the ring applies tension to the tape.

A modified form of the means for tensioning the tape is illustrated in Figs. 5 and 5a, in which parts, which are the same as in the machine shown in the other figures, are identified by the same reference characters. In the modified construction, a grooved pulley 118 is mounted on pin 61 between arms 60 and a similar pulley 119 is mounted on pin 64 between arms 63. A belt 120 is trained about the pulleys and also about a pulley 121, which is mounted on a ball bearing 122 encircling a stud 123. The stud extends through a slot in a bracket 124 attached to plate 26 of the winding head and the stud is provided with a head 125 bearing against one face of the bracket. A disc 126 of friction material is mounted between bracket 124 and pulley 121 and a sleeve 127 is mounted on stud 123 in position to engage the inner race of the bearing 122. The sleeve 127 is acted on by a spring 128, which encircles stud 123 and bears at one end against collar 127 and at the other against a knurled nut 129 threaded on the end of the stud. By turning the nut 129 on stud 123 to vary the compression of spring 128, the sleeve 127 may be caused to act on the inner race of bearing 122 to apply varying drag to pulley 121, while the tension on belt 120 may be varied by varying the position of stud 123 in bracket 124. The section of the belt between pulleys 118, 119 lies in contact with the winding of tape on the ring 53 and the belt is advanced with the winding as the ring rotates. By varying the tension and drag on the belt, as described, the tension on the tape may be correspondingly varied.

When a shuttle and winding ring of the type above described is employed in the application of a tape, which does not slide easily on the bottom of the channel in the ring, it may be desirable to employ the modified ring shown in Fig. 15. The modified ring is similar to ring 53 in the respects that it is formed with a peripheral channel 54' defined by parallel flanges having their outer walls cut away, so that they make good contact with the faces of the pulleys, and the ring also has a transverse joint 56'. A plurality of equally spaced openings 57' extend radially through the bottom of the channel and a roller 58' is mounted in each opening for rotation on a pin 59'. The rollers project into the bottom of the channel and enough rollers are provided, so that the inner convolution of a tape T wound upon the rollers has the shape of a polygon with the mid-point of each of its sides approximately tangent to the bottom of the channel in the ring. With this arrangement, the inner convolution of the tape makes only a light contact at most with the bottom of the channel and the tape can be easily withdrawn from the channel around one roller and through the opening, in which the roller is mounted.

In the embodiments of the invention above described, the material being applied is a tape, which is wound in a spiral winding in a peripheral channel in the winding ring in a preliminary operation and then drawn through an opening in the ring in being applied to the object. This arrangement avoids the necessity of using a slider, which is necessary when the wrapping material is drawn from the outer convolution of the winding on the ring and over the edge of the latter. When a slider of ordinary construction is employed, it has a part lying outside the outline of the ring and thus adding to the transverse dimension of the latter. The use of such a slider, accordingly, restricts the use of the machine to the winding of coils, in which the central opening is sufficiently large to permit the passage of the ring plus the slider. When the ring has a radial opening for the passage of the material to be applied to the coil and no slider is employed, the ring can be used in the winding of coils having a central opening of a diameter only slightly larger than the greatest transverse dimension of the ring alone.

Figures 13, 14:
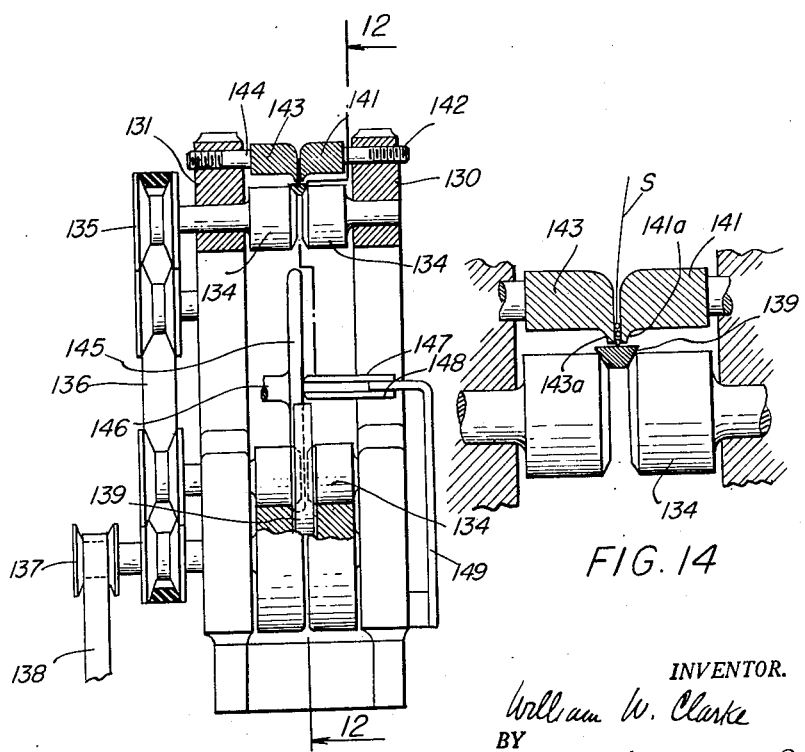
Fig. 13 is a sectional view on the line 13—13 of Fig. 12, with part of the winding and shuttle ring shown in elevation.
Fig. 14 is an enlargement of part of Fig. 13.

The essential features of a form of the new machine for winding strand material on a core to produce a coil and making use of a ring having an opening is shown in Figs. 12–14, incl. The machine includes a pair of suitably supported annular plates 130, 131 lying face to face and formed with a gap, in which an annular core 132 to be wound may be supported in a suitable holder 133. A plurality of pairs of rolls 134 are mounted between the plates on shafts supported for rotation in the plates and the rolls of each pair are coaxial and spaced a short distance. The peripheral edges of the opposed ends of the rolls are chamfered, so that each pair of rolls functions in the manner of a grooved pulley. The shafts of certain of the rolls extend out through plate 131 and carry pulleys 135 connected by a belt 136. The shaft carrying one of the pulleys 135 carries a second pulley 137 driven through a belt 138 by a motor not shown.

A winding and shuttle ring 139 is mounted to encircle the pairs of rolls and lie in the grooves defined by the chamfered edges of the coaxial rolls 134. The ring has a flat outer surface and its sides are convergent to conform to the slope of the chamfered edges of the rolls. The ring has a radial opening in the form of a gap indicated at 140 and, at one side of the gap, the end of the ring is formed with a short circumferential slot. Upon the rotation of pulleys 135 and their associated rolls 134, the ring 139 is caused to rotate in its plane.

An annular plate 141 is mounted on plate 130 on a plurality of screws 142 threaded into openings through plate 130. Plate 141 has an inner face lying in a plane at right angles to the axis of rotation of ring 139 and a lip 141a terminating close to the outer surface of the ring. An annular plate 143, which is similar to plate 141, is mounted on a plurality of screws 144 and openings through plate 131, and plate 143 has an inner face parallel to the corresponding face of plate 141 and a lip 143a lying close to the outer surface of the winding ring 139.

In the use of the modified construction shown in Figs. 12–14, inclusive, in the winding of a strand S, such as a fine wire upon a core, the annular plates 141, 143 are adjusted by their screws 142, 144 and by gauges, so that the gap between their opposed faces is slightly greater than the diameter of the wire. When the rings have been adjusted, the wire is drawn from a supply and wound upon ring 139 to form a spiral winding, the inner convolution of which lies in contact with the outer face of the ring and the other convolutions rest in contact with each other and are held in place by the opposed surfaces of plates 141, 143. After a supply of wire of sufficient length for winding upon the core has been wound on the winding ring, the end of the inner convolution of the wire on the ring is drawn through the gap 140 between the ends of the ring and held against the core 132, while the ring 139 is rotated to wind the wire upon the core.

In the winding of a coil of the wire upon the core, the development of uncontrolled slack in the wire is prevented by suitable means, such as the cooperating members within the winding ring, which are disclosed in the copending application of Clarke and Walendzik, Ser. No. 410,935, filed February 17, 1954. These members include a disc 145 mounted on a stem 146 to lie with its face in the plane of the winding ring 139. A pair of plates 147, 148 are mounted face to face in spaced relation on a resilient support 149 with their free edges pressed against the face of plate 145 by the action of the support. As the gap 140 in the winding ring moves upward past the horizontal, the length of the wire between the core and the gap in the ring forms a loop, which is gradually shortened as the rotation of the winding ring continues. As the loop of wire is shortened, it is drawn between the face of the disc 145 and the edges of plates 147, 148 bearing against the disc. The frictional engagement of the disc and plates with the wire control the loop, so that it is taken up gradually and the wire is thus wound properly upon the core.

I claim:

1. A machine for wrapping a tape helically upon an object of generally annular form, which comprises a winding ring interlinkable with the object and having a peripheral channel with a substantially flat bottom and an open top at least as wide as the bottom, the channel being adapted to have a supply of the tape wound in spiral convolutions therein and the ring having an opening through the bottom of the channel for unwinding of the tape from the innermost convolution, a plurality of rollers supporting the ring for rotation, at least one of the rollers being driven, cooperating members engaging the tape being withdrawn from the supply on the ring between the object and the opening through the bottom of the channel, means for mounting the members for rocking movement about an axis normal to the plane of rotation of the winding ring, the members being mounted on opposite sides of the plane of rotation of the ring and having interengaging parts, at least one of which extends normal to said plane, a spring urging the members to swing away from the object to cause them to restrain the tape to hold it taut, and means periodically acting on one member to separate the interengaging parts of the members.

2. A machine as defined in claim 1, in which one member is flexed by said periodically acting means to separate the interengaging parts of the members.

3. A machine as defined in claim 1, which includes means restraining movement of the supply of tape in the channel angularly relatively to the ring, said means including a pair of rollers entering the channel and engaging the tape supply, a resilient member supporting the rollers and pressing them against the tape, and means for varying the pressure exerted by the resilient member.

4. A machine as defined in claim 1, which includes means engaging the supply of tape in the channel and restraining movement of the supply angularly relatively to the ring, said means including a belt having a portion thereof in contact with the tape supply in the channel in the ring and movable with the tape supply, and means for applying tension to the belt.

5. A machine as defined in claim 4, which includes means resisting movement of the belt with the tape supply.

References Cited in the file of this patent

UNITED STATES PATENTS

| | | |
|---|---|---|
| 1,500,984 | Derry | July 8, 1924 |
| 1,998,908 | Rosener et al. | Apr. 23, 1935 |
| 2,011,172 | Coleman et al. | Aug. 13, 1935 |
| 2,185,883 | Berger | Jan. 2, 1940 |
| 2,414,603 | Nelson | Jan. 21, 1947 |
| 2,444,126 | Wirth | June 29, 1948 |
| 2,672,297 | Harder | Mar. 16, 1954 |

FOREIGN PATENTS

| | | |
|---|---|---|
| 573,639 | Great Britain | Nov. 29, 1945 |